April 7, 1959     J. A. GROSJEAN     2,881,421
SYSTEM COMPRISING A PLURALITY OF PULSE RADAR APPARATUS
Filed Oct. 27, 1953
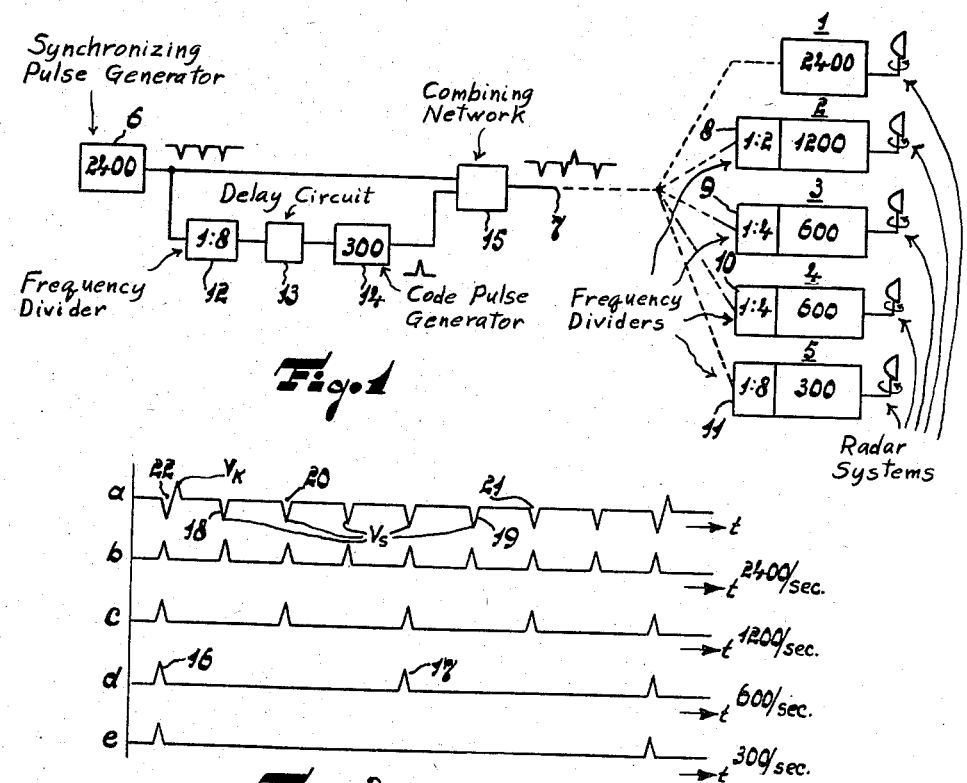
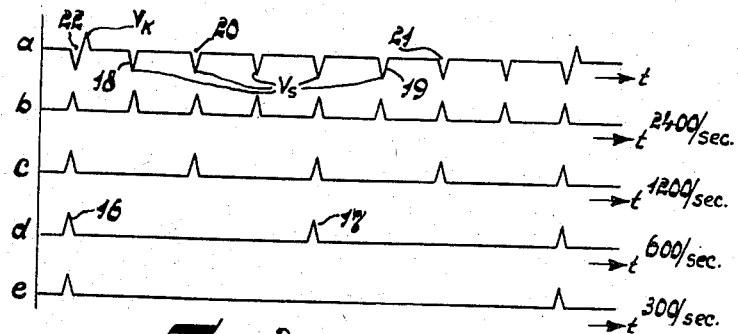
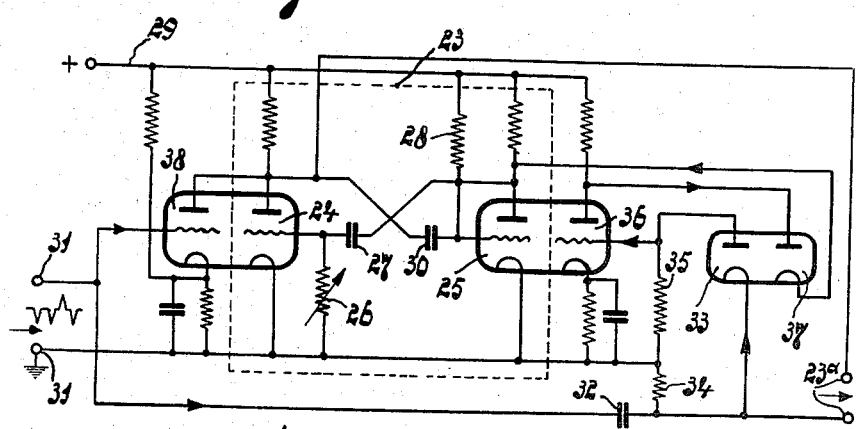
INVENTOR.
Johan Adriaan Grosjean
BY
Fred M Vogel
Agent

United States Patent Office 2,881,421
Patented Apr. 7, 1959

2,881,421

SYSTEM COMPRISING A PLURALITY OF PULSE RADAR APPARATUS

Johan Adriaan Grosjean, Hilversum, Netherlands, assignor, by mesne assignments, to North American Philips Company, Inc., New York, N.Y., a corporation of Delaware Application October 27, 1953, Serial No. 388,570

Claims priority, application Netherlands November 17, 1952

4 Claims. (Cl. 343—5)

The invention relates to a system comprising a plurality of pulse radar apparatus arranged one in the proximity of the other and comprising each a transmitting pulse modulator controlled by starting pulses. Such systems may, for example, be used on airfields and on board ships.

In order to reduce relative interference of the various radar apparatus it has been suggested to derive the starting pulses in the various pulse radar apparatus from frequency dividers, connected to a common synchronizing pulse generator.

The invention has for its object to provide a further reduction of the relative interference of the radar apparatus of such a system in which the radar apparatus are connected to a common synchronizing pulse generator.

According to the invention a frequency divider and a code pulse generator are, for this purpose, added to the synchronizing pulse generator of this system, the code pulse generator being controlled by pulses derived via the frequency divider from the synchronizing pulse generator, the code pulses being fed for additional synchronisation to the frequency dividers of the various pulse radar apparatus.

Then the instants of starting of the division cycles of the frequency dividers in the various radar apparatus can no longer coincide with arbitrary synchronizing pulses, but only with pulses of the synchronizing pulse series determined by the code pulses.

By using a suitable time delay for the code pulses and by providing opposite polarities for the synchronizing pulses and the code pulses the two pulse series may be supplied via a common conductor to the various radar apparatus, where they can be readily separated.

In order that the invention may be readily carried into effect, it will now be described with reference to the accompanying drawing.

Fig. 1 shows the block diagram of a system according to the invention.

Fig. 2 shows time diagrams *a* through *e* of the synchronizing pulses and the code pulses and of starting pulse series having different pulse recurrence frequencies, derived therefrom.

Fig. 3 shows a detail diagram of a preferred embodiment of a frequency divider synchronized by synchronizing pulses and code pulses.

Referring to Fig. 1, reference numerals 1 to 5 designate five pulse radar apparatus arranged one in the proximity of the other, having pulse repetition frequencies of, for example, 2400, 1200, 600, 600 and 300 c.p.s. respectively, these radar apparatus being synchronized by a common synchronizing pulse generator 6 (repetition frequency of the synchronizing pulses 2400 c.p.s.). The synchronizing pulse generator is connected through a common conductor 7 to frequency dividers 8 to 11 of the radar apparatus 2 to 5. The frequency dividers 8 to 11 supply starting pulses having the desired pulse repetition frequencies, their division ratios being, as indicated in the figures, 1:2, 1:4, 1:4 and 1:8 respectively.

To the synchronizing pulse generator 6 is added a frequency divider 12 having a division ratio of 1:8 and a code pulse generator 14, controlled by the output pulses of this frequency divider through a delay circuit 13. The repetition frequency of the code pulses thus obtained is 300 c.p.s. When the polarity of the synchronizing pulses is negative, the code pulses have positive polarity. The two pulse series are joined through a combining network 15, for example, a so-called combination amplifier, as indicated at $v_s$ and $v_k$ in Fig. 2*a* respectively, and fed to the conductor 7.

In the radar apparatus 1 the starting pulse generator is synchronized directly by the synchronizing pulses. The starting pulses thus obtained are shown in Fig. 2*b*.

The frequency dividers 8 to 11 in the further radar apparatus are synchronized both by the synchronizing pulses and the code pulses and supply starting pulses having sub-harmonic pulse repetition frequencies of 1200 (Fig. 2*c*), 600, 600 (Fig. 2*d*) and 300 c.p.s. (Fig. 2*e*) respectively. In the absence of code pulses the starting pulses 16 and 17 indicated in Fig. 2*d*, from, for example, the frequency divider 9, might coincide with synchronizing pulses 18 and 19 respectively of the synchronizing pulse series $v_s$ of Fig. 2*a* and those from frequency divider 10 for example with synchronizing pulses 20 and 21 of Fig. 2*a*.

In this case the transmitter pulses of the radar apparatus 10 would occur in the time during which the receiver of the radar apparatus 9 is sensitive, which could give rise to considerable interference. The transmitter pulses of the radar apparatus 9 and 10 occur in the case under consideration in the time during which the receiver of the radar apparatus 11 is sensitive and may thus also give rise to interference. The latter interference will, in general, be less troublesome than that of the radar apparatus 9 and 10, since the operational frequency of the radar apparatus 11 will be normally greatly different from the operational frequencies of the radar apparatus 9 and 10.

By using the invention the said interferences are avoided, since the code pulses compel the frequency dividers in the various radar apparatus to assume such a starting time of their division cycles that the starting pulse 16 of Fig. 2*d* coincides with a synchronizing pulse, for example 22 of Fig. 2*a*, immediately followed by a code pulse. The same applies to the simultaneous pulses of the starting pulse series indicated in Figs. 2*c* and 2*e*.

A preferred embodiment of a frequency divider synchronized by synchronizing pulses and code pulses is shown in Fig. 3.

This frequency divider comprises a multivibrator 23, outlined by a broken line, comprising triodes 24 and 25.

The control-grid of the triode 24 is connected on the one hand via an adjustable grid resistor 26 to earth and on the other hand through a feedback capacitor 27 to the anode of the triode 25. The control-grid of the triode 25 is connected on the one hand through a grid resistor 28 to the anode supply lead 29 and on the other hand through a feed-back capacitor 30 to the anode of the triode 24. The multivibrator 23, comprising the triodes 24 and 25 fed back cross-wise by the feed-back capacitors 27 and 30, is of a kind known per se for frequency division. The cut-off time of the triode 24, which varies in the first place with the time constant of the grid resistor 26 and the feed-back capacitor 27, must be chosen to exceed slightly one period of the divided frequency; the cut-off time of the triode 25, varying in the first place with the grid resistor 28 and the feed-back capacitor 30, must be shorter than the time interval between successive synchronizing pulses.

The aforesaid negative synchronizing pulses and the positive code pulses are fed to the input terminals 31 of the circuit shown in Fig. 3. Via a coupling capacitor 32 and a diode 33, cutting off positive pulses and comprising a cathode connected to earth through a resistor 34, the negative synchronizing pulses are fed to the control-grid of a normally operative triode amplifier 36, connected to earth through a grid resistor 35. The positive synchronizing pulses derived therefrom release the control grid of the triode 24 through a diode 37 and the feed-back capacitor 27, so that a division cycle is started. As soon as the triode 24 draws current, the triode 25 is cut off for a short time, after which the multivibrator flops back into the starting position and remains insensitive to one or more of the following synchronizing pulses, in accordance with the time constant of its grid circuit. The pulses having divided repetition frequency thus obtained are derived from the anode of the triode 24 and fed to the output terminals 23a.

One of the input terminals 31 is also connected to the control-grid of a triode amplifier 38, normally cut off by grid bias voltage and thus capable of passing only the positive code pulses supplied thereto, the negative synchronizing pulses being suppressed. The code pulses occurring at the anode of the triode amplifier 38 with negative polarity find their way through the feed-back capacitor 30 to the control-grid of the multivibrator triode and are capable of cutting off this triode. If the multivibrator has started a division cycle owing to the synchronizing pulses immediately preceding a code pulse, the triode 25 is cut off already at the occurrence of the code pulse, so that this pulse remains ineffective. However, if at a definite division ratio of, for example, 1:4, the multivibrator has responded to one of the three immediately preceding synchronizing pulses, the triode 25 is conductive at the occurrence of the code pulse and is cut off thereby. Thus the code pulse provides compulsorily a correct starting instant for the division cycles.

If desired, the synchronizing pulses and the code pulses may be transmitted with equal polarities. Then the code pulses may be separated from the synchronizing pulses by means known per se, for example with the aid of an integrating network.

In the case of the same polarities for synchronizing pulses and code pulses, these pulses need not have a relative time-lag, since the superimposition of the pulse series results in that the synchronizing pulses to be codified assume a higher amplitude than the normal amplitude owing to the code pulses. Separation of the pulse series may thus be carried out in accordance with the amplitudes.

It will finally be obvious that not only the frequency dividers 8 to 11 of the kind shown in Fig. 3 but also other kinds, for example, the so-called blocking oscillators may be used. The latter may be caused to respond in anticipation by supplying the code pulses having a particularly high amplitude to the control-grid.

What is claimed is:

1. A radar system comprising a plurality of pulse radar apparatus each having a transmitter pulse modulator governed by starting pulses, a synchronizing pulse generator for producing synchronizing pulses, a frequency-dividing code pulse generator circuit connected to receive said synchronizing pulses and produce code pulses at a lower frequency rate than that of said synchronizing pulses and associated with periodic ones of said synchronizing pulses, means connected to feed both said synchronizing pulses and said code pulses to each of said radar apparatus, means connected in at least one of said radar apparatus to derive said starting pulses in accordance with all of said synchronizing pulses, and code-pulse responsive means connected in at least one other of said radar apparatus to derive said starting pulses in accordance with only said periodic ones of said synchronizing pulses which are associated with said code pulses.

2. A system as claimed in claim 1, in which said frequency-dividing code pulse generator circuit comprises a code pulse generator, and a frequency divider and a delay circuit connected serially between said code pulse generator and said synchronizing pulse generator, and further including a signal combining network connected to receive and combine said synchronizing pulses and code pulses.

3. A system as claimed in claim 2, in which said signal combining network is connected to combine said synchronizing pulses and said code pulses with opposite polarities.

4. A system as claimed in claim 1, in which said code-pulse responsive means comprises a multivibrator frequency divider having two amplifying tubes each having a control grid and an output electrode, cross-coupled feedback means interconnecting the control grids and output electrodes of said tubes, means connected to feed said synchronizing pulses to one of said control grids with a given polarity, and means connected to feed said code pulses to the other of said control grids with a polarity opposite to said given polarity.

References Cited in the file of this patent

UNITED STATES PATENTS

| | | |
|---|---|---|
| 2,419,525 | Alford | Apr. 29, 1947 |
| 2,436,376 | Bown | Feb. 24, 1948 |
| 2,521,789 | Grosdoff | Sept. 12, 1950 |
| 2,527,638 | Kreer et al. | Oct. 31, 1950 |
| 2,586,888 | Varela | Feb. 26, 1952 |
| 2,605,408 | Millman | July 29, 1952 |
| 2,627,069 | Huber et al. | Jan. 27, 1953 |
| 2,672,607 | Mulligan | Mar. 16, 1954 |
| 2,676,317 | Purington | Apr. 20, 1954 |
| 2,737,853 | Gravenhorst et al. | Mar. 13, 1956 |